United States Patent [19]

Seligson

[11] Patent Number: 4,805,038
[45] Date of Patent: Feb. 14, 1989

[54] IMAGING APPARATUS WHICH INCLUDES A LIGHT-VALVE ARRAY HAVING ELECTROSTATICALLY DEFLECTABLE ELEMENTS

[75] Inventor: Joel L. Seligson, Misgav, Israel

[73] Assignee: Eastman Kodak Company, Rochester, N.Y.

[21] Appl. No.: 79,382

[22] Filed: Jul. 30, 1987

[51] Int. Cl.$^4$ .................. H04N 1/036; H04N 3/02; G02B 6/26; G02B 26/00

[52] U.S. Cl. ........................... 358/296; 346/108; 350/96.15; 350/96.2; 350/269; 350/359; 358/200

[58] Field of Search ............... 350/96.15, 96.13, 96.20, 350/269, 270, 275, 359; 358/199, 200, 236, 296, 298, 300, 302; 346/107 R, 108

[56] References Cited

U.S. PATENT DOCUMENTS

| | | | |
|---|---|---|---|
| 1,848,888 | 3/1932 | Kendall | 350/269 |
| 1,964,062 | 6/1934 | Jenkins | 350/269 |
| 3,320,617 | 5/1967 | Hawkins et al. | 346/108 |
| 3,801,185 | 4/1974 | Ramaswamy et al. | 350/359 |
| 4,065,677 | 12/1977 | Micheron et al. | 350/269 |
| 4,152,043 | 5/1979 | Albanese | 350/96.2 |
| 4,162,118 | 7/1979 | Conwell | 350/359 |
| 4,356,730 | 11/1982 | Cade | 73/517 R |
| 4,378,568 | 3/1983 | Mir | 358/296 |
| 4,454,547 | 6/1984 | Yip et al. | 358/293 |
| 4,492,435 | 1/1985 | Banton et al. | 350/269 |
| 4,731,670 | 3/1988 | Allen et al. | 358/298 |

FOREIGN PATENT DOCUMENTS 56-164307 12/1981 Japan .................. 350/96.13

OTHER PUBLICATIONS

Peterson, K. E., "Micromechanical Light Deflector Array", *IBM Technical Disclosure Bulletin*, vol. 20, No. 1, Jun. 1977, pp. 355-356.
"Dynamic Micromechanics on Silicon: Techniques and Devices", by K. E. Peterson, IEEE Trans. Elec. Devices, ED-25, #10, Oct. 1978, pp. 1241-1250.

*Primary Examiner*—James J. Groody
*Assistant Examiner*—Randall S. Svihla
*Attorney, Agent, or Firm*—Donald D. Schaper

[57] ABSTRACT

Imaging apparatus is disclosed for exposing a recording medium to produce an image in accordance with information contained in an electrical signal. The apparatus comprises a light source, optical means for imaging light onto the recording medium, and a light-valve array to control the light reaching selected areas of the recording medium. In order to provide an improved means for controlling the light, the light-valve array is comprised of a plurality of electrostatically deflectable elements each of which contains a transmitter waveguide for transmitting light from the source to a receptor waveguide. The elements can be deflected from a first position in which the transmitter and receptor waveguides are axially aligned for transmitting light therethrough to a second position in which no light can be transmitted from the transmitter waveguides to the receptor waveguides; each of the elements is selectively deflectable in response to an information signal. Light from the receptor waveguides is imaged onto the recording medium.

15 Claims, 2 Drawing Sheets

IMAGING APPARATUS WHICH INCLUDES A LIGHT-VALVE ARRAY HAVING ELECTROSTATICALLY DEFLECTABLE ELEMENTS

CROSS-REFERENCE TO RELATED APPLICATIONS

Reference is made to U.S. Pat. application Ser. No. 079,383, issued as U.S. Pat. No. 4,731,670, entitled "Imaging Apparatus," and filed in the name of James D. Allen on even date herewith.

FIELD OF THE INVENTION

The present invention relates to imaging apparatus, and more particularly to such apparatus in which a light-valve array is used to control the light transmitted to a recording medium.

STATE OF THE PRIOR ART

Various types of imaging apparatus are used to effect the exposure of a recording medium in accordance with information in an electrical signal. For example, in U. S. Pat. No. 4,454,547, there is disclosed an output scanner which comprises a source of high intensity radiation, means for converting radiation from the source to a plurality of individual radiation beams, and a modular array of scanner elements which can be positioned in response to an information signal to direct the beams onto an imaging member. The array of scanner elements includes a silicon micromechanical device in which the scanner elements are flexible fingers which can be selectively deflected by an electrostatic force resulting from a voltage imposed on the fingers. A problem with the scanner disclosed in this patent is that a large imaging system is required to image the individual scanner elements onto the imaging member. The imaging system used, a so-called Selfoc array, is a one-to-one system, and thus, the overall length of the modulator array must be equal to the width of the desired image. This in turn constrains the size of the silicon micromechanical device to that of the final image.

In U.S. Pat. No. 4,356,730, an electrostatically deformographic switch is disclosed for use in either a display or a memory device. In one embodiment of the invention, a switch element comprises a waveguide of silicon dioxide and a metal electrode on the silicon dioxide for controlling the switch element. Such a waveguide is very lossy and would not be suitable for use in high-speed imaging apparatus.

SUMMARY OF THE INVENTION

It is an object of the present invention to overcome the problems in the prior art and to provide imaging apparatus which is relatively compact and produces an image of high resolution.

In accordance with one aspect of the present invention, there is provided imaging apparatus for exposing a recording medium, the apparatus comprising: a light source; a light-valve array for receiving light from the source, the array having a plurality of individually deflectable elements, each of the elements including a transmitter multimode waveguide, a plurality of receptor multimode waveguides arranged opposite the transmitter waveguides, the elements being movable from a first position in which the transmitter and receptor waveguides are axially aligned for transmitting light therethrough to a second position in which no light can be transmitted from the transmitter waveguides to the receptor waveguides, each of the elements being selectively deflectable in response to an information signal; and optical means for imaging the beams on the recording medium.

In accordance with another aspect of the invention, there is provided a light valve comprising: a body of semiconductive material having a layer of insulating material thereon, the body having an opening therein which extends through the insulating material to the semiconductor material and defines first and second sections of the body; an elongated element extending from the first section and projecting over the opening, the element having a bottom layer formed of the insulating material, an electrode on the insulating material, and a transmitter waveguide on the electrode; and a receptor waveguide on the second section, said receptor waveguide being axially aligned with the transmitter waveguide.

In one embodiment of the present invention, light from a source is transmitted through a cylindrical lens to a light-valve array. The light-valve array is controlled by an information signal which selectively deflects elements in the array to modulate each of the light beams. The modulated beams from the light-valve array are passed through waveguides to a series of lenses which serve to focus the beams on the recording medium. The recording medium is movable relative to the lenses.

An advantage of the imaging apparatus disclosed herein is that all of the control elements for the apparatus can be contained in a relatively small space. The light-valve array can be enclosed and can be made much smaller than the image on the recording medium. A further advantage of the apparatus is that light losses in the apparatus are very small, and the image produced is of a high resolution.

Other features and advantages will become apparent with reference to the following Description of the Preferred Embodiment when read in light of the attached drawings.

DESCRIPTION OF THE PREFERRED EMBODIMENT

Figure 1:
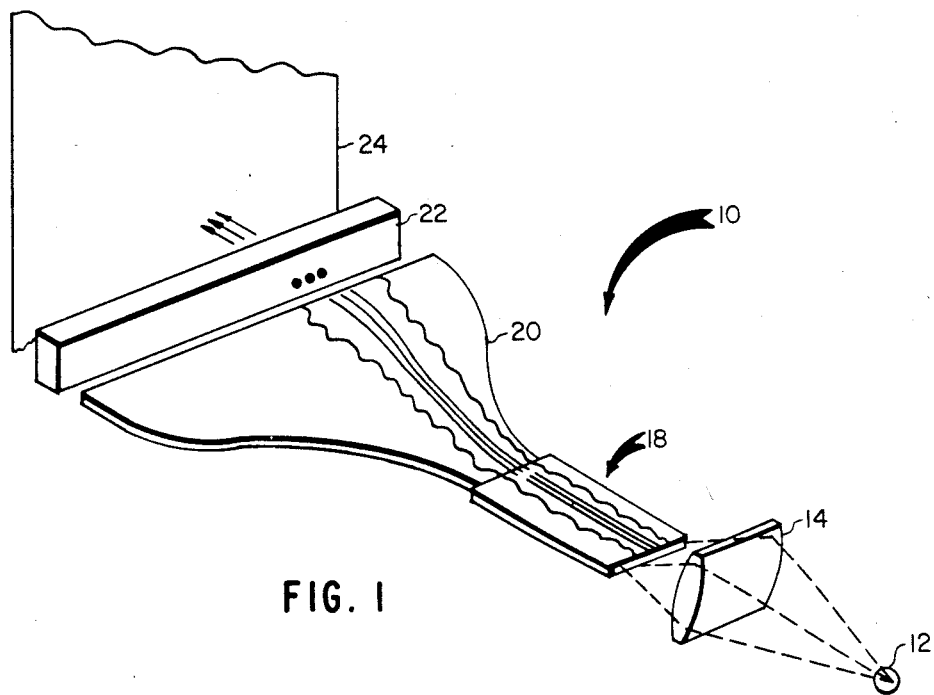
FIG. 1 is a perspective view of the imaging apparatus of the present invention.

With reference to FIG. 1, there is shown imaging apparatus 10 constructed in accordance with the present invention. Imaging apparatus 10 comprises a light source 12 which can be, for example, an incandescent light, a cylindrical lens 14, a light-valve array 18, a fanned-out array 20 of multimode waveguides, and an array 22 of gradient-index lenses which serve to image the ends of the individual waveguides in array 20 onto a recording medium 24. The lenses in the array 22 can be, for example, lenses sold under the trademark "Selfoc," by Nippon Sheet Glass Co., Ltd.

As used herein, the term "multimode waveguide" refers to a waveguide which is relatively thick and has defined boundaries for the propagation of light therethrough.

Figure 2:
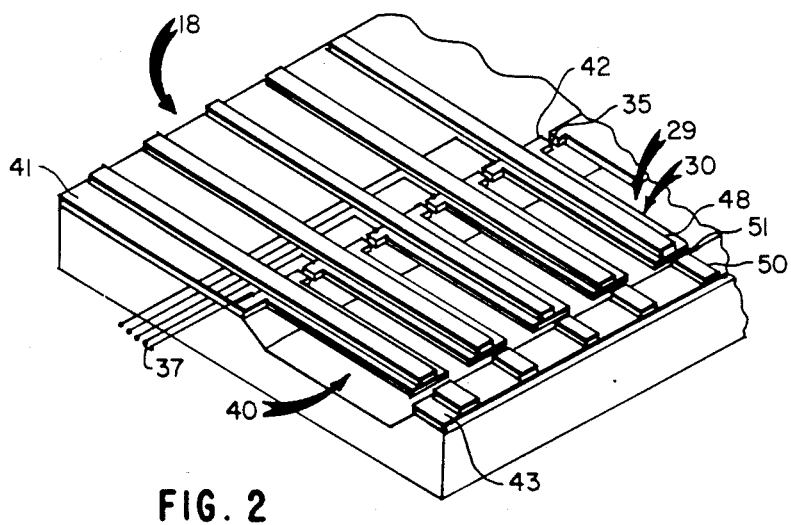
FIG. 2 is a perspective view of the light-valve array of the present invention.
Figure 3:
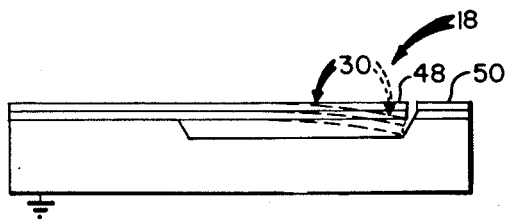
FIG. 3 is a side elevational view of the array shown in FIG. 2, showing one of the elements in an initial position and in a deflected position.

Light-valve array 18, as shown in FIGS. 2 and 3, comprises a plurality of light valves 29 each of which includes an electrostatically deflectable element 30. Elements 30 are supported in cantilever fashion and are electrically isolated from one another by gaps 35. As will be explained in more detail hereinafter, a voltage can be applied to a selected element 30 through a lead 37 to effect a deflection of the element 30, the deflected position being shown in dotted lines in FIG. 3.

Figure 4:
FIGS. 4–7 are sectional views showing the formation of the light-valve array.

The construction of light valves 29 is shown in FIGS. 4–7. As shown in FIG. 4, a body 32 of semiconductor material, such as silicon, includes a p-type substrate 34 having an epitaxial layer 36 formed thereon and a highly-doped p+ type region (not shown) disposed between the epitaxial layer 36 and the substrate 34. A silicon dioxide layer 38, which serves as both an electrically-insulating material and an optically-insulating material, is formed on layer 36.

Figure 5:
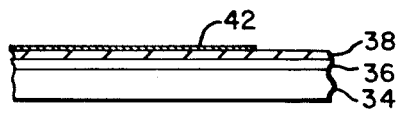
Figure 6:
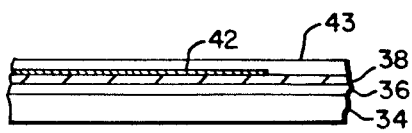

A plurality of metal electrodes 42 are formed on the silicon dioxide layer 38, as shown in FIGS. 2 and 5. The metal of electrodes 42 can be, for example, gold or chromium. After the electrodes 42 have been formed, a layer of waveguide material 43 is deposited over electrodes 42 and over the exposed portions of silicon dioxide layer 38, as shown in FIG. 6. The waveguide material is then patterned, using known photolithographic methods and ion beam etching or reactive ion beam etching; in this step, a transmitter waveguide 48 and a receptor waveguide 50 are formed as shown in FIG. 2. The gap 51 between waveguides 48 and 50 is generally equal to the thickness of the waveguides 48, 50. Waveguides 48 and 50 can be formed from PMMA (poly(methyl methacrylate)) or other patternable transparent material having a refractive index sufficiently higher than that of silicon dioxide to facilitate transmission of light through the waveguides 48 and 50. Silicon dioxide has a refractive index of 1.46, and PMMA has a refractive index of 1.49.

Figure 7:
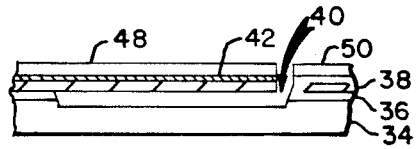

In a final step, an etchant is applied to the silicon dioxide layer 38 to define the outlines of elements 30, and another etchant is applied to form a well 40 in the body 32 under the silicon dioxide layer 38. The well 40 separates the body 32 into a section 41 which is positioned adjacent lens 14 in apparatus 10 and a section 45 which is positioned adjacent array 20. As shown in FIGS. 2 and 7, elements 30 extend over well 40 in a cantilever fashion.

Each of the elements 30 responds to the imposition of a voltage between its electrode 42 and the p+ layer (not shown) located between substrate 34 and epitaxial layer 36, the resulting electrostatic force causing the element 30 to bend or deflect downwardly from an initial position (shown in solid lines in FIG. 3) to a deflected position (shown in dotted lines in FIG. 3). When no voltage is applied to electrode 42, it being assumed that the effects of material stress and gravity are negligible, element 30 is not deflected. When a voltage is applied, element 30 deflects in proportion to the amount of voltage applied until the voltage reaches a critical level which is referred to as the threshold voltage. At the threshold voltage, the element 30 becomes unstable, and the element 30 deflects, without any increase in applied voltage, until it touches the bottom of well 40 (FIG. 3).

If the voltage to element 30 is cut off at anytime before the threshold voltage is reached, element 30 will return to its initial position. However, after the voltage exceeds the threshold level and element 30 has snapped into a fully deflected position, element 30 can be maintained in its deflected position with a voltage less than threshold. Before the element 30 will return to its initial position, after having been put into a fully-deflected position, the applied voltage must fall below a minimum holding voltage which is nearly zero volts. With reference to FIGS. 2, 3, and 7, it will be apparent that when no voltage is applied to element 30, light applied to a transmitter waveguide 48 will be transmitted to a receptor waveguide 50 and will ultimately be imaged onto recording medium 24; and when a threshold voltage is applied to the electrode 42 of an element 30, the element 30 will be deflected to a position in which no light will be transmitted from waveguide 48 to waveguide 50.

It is important in the functioning of apparatus 10 that elements 30 have a high frequency response. In Table I, computed resonant frequencies and threshold voltages are shown for elements 30 of three different sizes. The first resonant frequency ($f_R$) for transverse (or bending) oscillations of a uniform beam is given by the equation:

$$f_R = \frac{3.52}{2\pi} \sqrt{\frac{EI}{ul^4}}$$

where
 E is Young's modulus;
 I is the moment of inertia;
 u is the weight per unit length of element 30;
 l is the length of element 30.

In using the above formula to compute the resonant frequency of element 30, the effective EI product for a multilayer beam, such as element 30, can be calculated using well-known techniques. In each of the elements 30 in Table I, the etched depth of well 40 is generally equal to the thickness of waveguide 48, the thickness of the silicon dioxide layer 38 is one micrometer, and the metal electrode 42 is formed from chromium at a thickness of 50 nm.

TABLE I

| Waveguide Thickness (um) | Element Length (mm) | Resonant Frequency (khz) | Threshold Voltage (V) |
|---|---|---|---|
| 10 | 1.0 | 10 | 20 |
| 26 | 1.6 | 10 | 100 |
| 38 | 6.3 | 1 | 20 |

In the operation of apparatus 10, an electrical signal representing an image to be recorded is provided to apparatus 10 by a suitable source (not shown), such as an input scanner, a communication channel or a memory device. A control module (not shown) is provided to energize the elements 30 in accordance with the electrical signal in a well known manner. It will be seen, from FIG. 3, that when a voltage is supplied to an element 30 no light is transmitted from waveguide 48 to waveguide 50 and on to the recording medium 24. In any given element of time, the state of an element 30 would represent one pixel, the non deflected position representing, for example, a binary 1 and the deflected position representing a binary 0. Thus, by controlling the various elements 30 over time in accordance with an electrical signal and in timed relation with movement of the recording medium 24, an image will be formed on the recording medium 24.

The invention has been described in detail with particular reference to a preferred embodiment thereof, but it will be understood that variations and modifications can be effected within the spirit and scope of the invention.

I claim:

1. Imaging apparatus for exposing a recording medium, said apparatus comprising:
   a light source;
   a light-valve array for receiving light from said source, said array having a plurality of individually deflectable elements, each of said elements including a transmitter multimode waveguide and an electrode, a plurality of receptor multimode waveguides arranged opposite said transmitter waveguides, each of said elements being deflectable upon application of a threshold voltage to the electrode thereof from a first position in which its transmitter waveguide is axially aligned with a corresponding one of said receptor waveguides for transmitting a light beam therethrough to a second position in which no light beam can be transmitted from its transmitter waveguide to said corresponding receptor waveguide, each of said elements being selectively deflectable in response to an information signal; and
   optical means for receiving said light beams from said elements and for imaging said light beams on said recording medium.

2. Imaging apparatus, as defined in claim 1, wherein said optical means comprises an array of multimode waveguides, and said array of multimode waveguides includes a multimode waveguide opposite each of said receptor waveguides.

3. Imaging apparatus, as defined in claim 2, wherein said optical means includes a lens array for transmitting individual light beams from said array of multimode waveguides to said recording medium.

4. Imaging apparatus, as defined in claim 3, wherein said array of multimode waveguides has a first end adjacent said light-valve array and a second end adjacent said lens array, and said second end is substantially wider than said first end.

5. Imaging apparatus, as defined in claim 1, wherein said apparatus includes a lens for imaging said light source onto said light-valve array.

6. A light valve comprising:
   a body of semiconductive material having an insulating layer thereon, said body having an opening therein which extends through said insulating material to said semiconductor material and defines first and second sections of said body;
   an elongated element extending from said first section and projecting over said opening, said element having a bottom layer formed of said insulating material, an electrode on said insulating material, and a transmitter waveguide on said electrode; and
   a receptor waveguide on said second section, said receptor waveguide being axially aligned with said transmitter waveguide.

7. A light valve, as defined in claim 6, wherein said transmitter waveguide extends over the insulating material on said first section.

8. A light valve, as defined in claim 6, wherein said waveguides are formed of a material having a higher refractive index than the refractive index of said insulating material.

9. A light valve, as defined in claim 6, wherein said waveguides are formed from poly (methyl methacrylate) (PMMA).

10. A light valve, as defined in claim 6, wherein said insulating material is silicon dioxide.

11. A light valve, as defined in claim 6, wherein said waveguides have a thickness of between about 10 um and about 38 um.

12. A light valve, as defined in claim 6, wherein said element has a length of between about 1 mm and about 6.3 mm.

13. A light valve, as defined in claim 6, wherein said electrode is wider than said transmitter waveguide.

14. A light valve for use in a light-valve array, said light valve comprising an electrostatically deflectable element having a first waveguide and an electrode, and a second waveguide disposed opposite said first waveguide, characterized in that said element includes a layer of material under said first waveguide having a refractive index lower than said first waveguide.

15. A light valve according to claim 14, characterized in that said electrode is under a portion of said first waveguide.

* * * * *